Patented Apr. 1, 1947

2,418,290

UNITED STATES PATENT OFFICE 2,418,290

UNSATURATED 1,3-GLYCOLS

Herman A. Bruson and Warren D. Niederhauser, Philadelphia, Pa., assignors to The Resinous Products & Chemical Company, Philadelphia, Pa., a corporation of Delaware No Drawing. Application April 24, 1945, Serial No. 590,124

10 Claims. (Cl. 260—635)

This invention relates to unsaturated 1,3-glycols corresponding to the formula

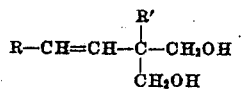

wherein R and R' are hydrocarbon groups. It further relates to a method for the preparation of these glycols.

We have found that $\alpha,\gamma$-disubstituted crotonaldehydes react with formaldehyde in the presence of a water-soluble fixed base to give glycols of the above formula. The reaction involves a transposition of the double bond, an addition to the $\alpha$-carbon atom, and a reduction of the carbonyl group. The reaction may be represented by the equation

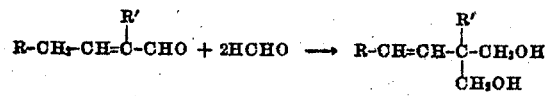

Typical $\alpha,\gamma$-dihydrocarbon substituted crotonaldehydes which are useful may be represented by the formula

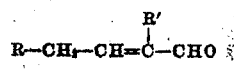

in which R and R' are alkyl, aryl, arylalkyl, or cycloalkyl groups. R' is preferably an alkyl group, such as methyl, ethyl, propyl, butyl, hexyl, etc., but may also be a phenyl, substituted phenyl such as methylphenyl, tert.-butylphenyl, or similar group, or a benzyl, phenylethyl, cyclohexyl, methylcyclohexyl, or other substituent hydrocarbon group. R may similarly be any of these groups, particularly an alkyl group, which need not be the same as R'. These $\alpha,\gamma$-disubstituted crotonaldehydes, which may also be considered acrolein derivatives, are obtainable by condensing together two molecules of the same aldehyde or a molecule of each of two different aldehydes by known methods which involve aldolization and elimination of water. When mixtures of unsaturated aldehydes are obtained, they may be separated into different entities or, if desired, a mixture may be reacted with formaldehyde to give a mixture of glycols.

Representative of the aldehydes of the above formula are $\alpha,\gamma$-dimethyl crotonaldehyde, $\alpha$-$\gamma$-diethyl crotonaldehyde, $\alpha,\gamma$-dibutyl crotonaldehyde, $\alpha$-methyl-$\gamma$-ethyl crotonaldehyde, $\alpha$-methyl-$\gamma$-phenyl crotonaldehyde, $\alpha$-methyl-$\gamma$-benzyl crotonaldehyde, $\alpha$-methyl-$\gamma$-cyclohexyl crotonaldehyde, $\alpha$-ethyl-$\gamma$-phenyl crotonaldehyde, and homologues thereof.

Typical water-soluble fixed bases which may be used are the alkali metal hydroxides, particularly sodium and potassium hydroxides, the alkaline earth hydroxides, including calcium hydroxide and barium hydroxide, the strongly alkaline quaternary bases such as benzyl trimethyl ammonium hydroxide or dibenzyl dimethyl ammonium hydroxide, and with some advantage an alkali carbonate, such as sodium or potassium carbonate. Any non-volatile base may thus be used. The fixed base may be used in the form of an aqueous solution or slurry. It has been found desirable to use the fixed base in an amount at least equivalent to the $\alpha,\gamma$-disubstituted aldehyde. A molecular excess appears in many cases to improve the yields. In the reaction products, the cation from the base is found in the form of a formate.

The formaldehyde may be supplied by an aqueous or organic solvent solution thereof or from a compound yielding formaldehyde under the conditions of the reaction, such as paraformaldehyde. Although two mols of formaldehyde per mol of $\alpha,\gamma$-disubstituted crotonaldehyde are theoretically required in the reaction, it has been found desirable to use a larger ratio to promote better yields. The reaction mixture may advantageously be made with two and a half to four mols or even a larger excess of formaldehyde per mol of the unsaturated aldehyde.

The reaction of $\alpha,\gamma$-disubstituted crotonaldehyde with formaldehyde in the presence of a fixed base may be effected by heating at 50° to 110° C. An inert solvent, such as ethyl alcohol, isopropyl alcohol, benzene, naphtha, or toluene, may effectively be used and the reaction carried on under reflux conditions. Good stirring is advantageous, particularly where two liquid phases are at hand.

Specific details of typical preparation of the unsaturated 1,3-glycols of this invention are given in the following examples. The parts given are by weight.

Example 1

A solution containing 252 parts of $\alpha,\gamma$-diethyl crotonaldehyde, 489 parts of 36% aqueous formaldehyde, and 400 parts of ethyl alcohol was stirred and maintained at 86° C. by heating while to it was added 246 parts of 50% aqueous potassium hydroxide over a period of eighty minutes. The reaction mixture was then stirred under reflux at 85° C. for sixteen hours. The mixture thereupon was cooled and excess alkali contained therein was neutralized with carbon dioxide. The approximately neutral mixture was washed with water and separated to give 253 parts of crude product, which, on distillation, gave 153 parts boiling at 115°–135° C./5 mm. On redistillation, the fraction boiling at 150°–152° C./21 mm. was a colorless, sweet-smelling liquid with a density, $d_4^{25}$, of 0.9663 and a refractive index, $n_D^{25}$, of 1.4751. Its structure is

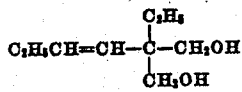

Example 2

A solution containing 43 parts of α,γ-diamyl crotonaldehyde, 50 parts of 36% aqueous formaldehyde, and 80 parts of ethyl alcohol was stirred and maintained at 85° C. by heating while to it there was added 25 parts of a 50% aqueous solution of potassium hydroxide over a period of fifteen minutes. The reaction mixture was stirred under reflux at 83° C. for twenty-one hours. Most of the alcohol was then distilled off under reduced pressure, leaving a residual product which was washed with dilute formic acid and with water and dried on the steam bath under reduced pressure to give 39 parts of pale yellow oil. This was distilled under reduced pressure to give 24 parts of a fraction boiling at 150°–190° C./5 mm. On redistillation, the product came over at 165°–170° C./5 mm. Its structure is

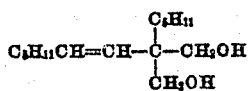

Example 3

A solution of 106 parts of sodium carbonate in 300 parts of water was added dropwise to a stirred mixture of 126 parts of α,γ-diethyl crotonaldehyde, 245 parts of aqueous 37% formaldehyde, and 240 parts of 95% ethyl alcohol at 80° C. The resulting reaction mixture was heated under reflux for twenty hours at 80° to 95° C. The solvents were then removed by heating on a steam bath under reduced pressure. The resulting product was washed and dried. There was obtained 97 parts of a dark oil which was distilled at low pressure. The fraction distilling at 110°–115° C. at 1 mm. pressure, amounting to seventy parts, was identified as

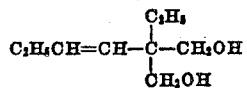

By reacting α,γ-di-hydrocarbon substituted crotonaldehydes with two mols of formaldehyde in the presence of a fixed base, there are obtained 1,3-dihydric alcohols which carry two substituents on the 2-carbon atom, one of which contains an olefinic linkage in a position which is α,β to this carbon atom. These dihydric alcohols are useful in the preparation of resins, for example with dibasic acids and/or fatty acids, and plasticizers. They are also useful as solvents.

We claim:

1. A method for preparing glycols of the formula

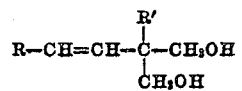

wherein R and R' are each hydrocarbon groups, which comprises reacting together in the presence of a water-soluble fixed base an α,γ-dihydrocarbon substituted crotonaldehyde and formaldehyde.

2. A method for preparing glycols of the formula

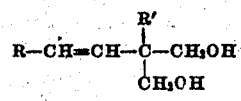

wherein R and R' are hydrocarbon groups, which comprises reacting together by heating at 50° C. to about 110° C. in the presence of a water-soluble fixed base an α,γ-di-hydrocarbon substituted crotonaldehyde and formaldehyde.

3. A method for preparing glycols of the formula

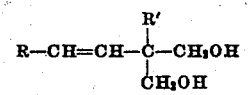

wherein R and R' are hydrocarbon groups, which comprises reacting together by heating at 50° C. to about 110° C. in an organic solvent and in the presence of an alkali hydroxide an α,γ-dihydrocarbon substituted crotonaldehyde and formaldehyde.

4. A method for preparing glycols of the formula

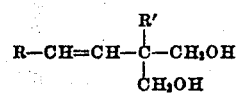

wherein R and R' are hydrocarbon groups, which comprises reacting together at 50° C. to about 110° C. in the presence of a water-soluble fixed base and water one mol of an α,γ-dihydrocarbon substituted crotonaldehyde and at least two mols of formaldehyde.

5. A method for preparing glycols of the formula

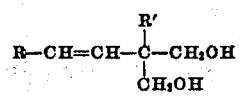

wherein R and R' are hydrocarbon groups, which comprises reacting together at about 50° C. to about 110° C. one molecular equivalent of an α,γ-dihydrocarbon substituted crotonaldehyde, a molecular equivalent of a water-soluble fixed base, and two molecular equivalents of formaldehyde.

6. A method for preparing glycols of the formula

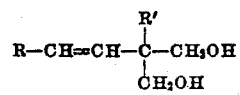

wherein R and R' are alkyl groups, which comprises reacting together at about 50° C. to about 110° C. one molecular equivalent of an α,γ-dialkyl crotonaldehyde, a molecular equivalent of a soluble inorganic hydroxide, and two molecular equivalents of formaldehyde.

7. A method for preparing glycols of the formula

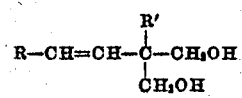

wherein R and R' are alkyl groups, which comprises reacting together at about 50° C. to about 110° C. one molecular equivalent of an α,γ-dialkyl crotonaldehyde, a molecular equivalent of an alkali carbonate, and two molecular equivalents of formaldehyde.

8. A method for preparing glycols of the formula $$R-CH=CH-\underset{\underset{CH_2OH}{|}}{\overset{\overset{R'}{|}}{C}}-CH_2OH$$

wherein R and R' are alkyl groups, which comprises mixing and heating together at 50° to about 110° C. in the presence of water one molecular equivalent of an α,γ-dialkyl crotonaldehyde, at least one molecular equivalent of a strong inorganic hydroxide, and at least two molecular equivalents of formaldehyde.

9. A method for preparing a glycol of the formula $$CH_3CH_2CH=CH-\underset{\underset{CH_2OH}{|}}{\overset{\overset{C_2H_5}{|}}{C}}-CH_2OH$$

which comprises reacting together at about 50° C. to about 110° C. in the presence of a strongly alkaline hydroxide α,γ-diethyl crotonaldehyde and an excess of formaldehyde.

10. As a new compound, the unsaturated glycol having the formula $$CH_3CH_2-CH=CH-\underset{\underset{CH_2OH}{|}}{\overset{\overset{C_2H_5}{|}}{C}}-CH_2OH$$

HERMAN A. BRUSON.
WARREN D. NIEDERHAUSER.

REFERENCES CITED

The following references are of record in the file of this patent:

Walker, "Formaldehyde," pp. 150–155. (Copy Div. 6.)